United States Patent [19]

Freeburg

[11] Patent Number: 5,394,561
[45] Date of Patent: Feb. 28, 1995

[54] NETWORKED SATELLITE AND TERRESTRIAL CELLULAR RADIOTELEPHONE SYSTEMS

[75] Inventor: Thomas A. Freeburg, Arlington Heights, Ill.

[73] Assignee: Motorola, Inc., Schaumburg, Ill.

[21] Appl. No.: 95,811

[22] Filed: Jul. 22, 1993

Related U.S. Application Data

[60] Continuation of Ser. No. 761,203, Sep. 17, 1991, abandoned, which is a division of Ser. No. 488,912, Mar. 6, 1990, abandoned.

[51] Int. Cl.⁶ .............................................. H04B 7/185
[52] U.S. Cl. .................................. 455/13.1; 455/13.2; 455/33.2; 455/56.1; 455/63; 342/356; 379/60
[58] Field of Search ................... 455/12.1, 13.1, 13.2, 455/13.3, 13.4, 33.1, 33.2, 33.3, 33.4, 34.1, 34.2, 63, 69–70, 127, 232.1, 234.1, 234.2, 54.1, 56.1; 342/356; 379/58–60, 63

[56] References Cited

U.S. PATENT DOCUMENTS

| | | | |
|---|---|---|---|
| 4,731,866 | 3/1988 | Muratini et al. | 455/12.1 |
| 4,943,808 | 7/1990 | Dulck et al. | 455/13.1 |
| 5,008,952 | 4/1991 | Davis et al. | 455/12.1 |

OTHER PUBLICATIONS

Kachmar, Michael, "Land–Mobile Satellites Pick-Up Where Cellular Radio Leaves Off" *Microwaves and RF.* 1984, pp. 33–35.

Binder, et al: "Crosslink Architecture For a Multiple Satellite System"; IEEE Jan. 1987; pp. 74–81.
Dondl, Peter: "Digital Network Oriented Mobile Radio Satellite System".
Rafferty, et al: "RF Developement For Mobile–Satellite Systems"; *MSN & CT* Nov. 1988, pp. 28–30 and 37.
Del Re, Enrico: "An Integrated Satellite–Cellular Land–Mobile System For Europe".

Primary Examiner—Reinhard J. Eisenzopf
Assistant Examiner—Andrew Faile
Attorney, Agent, or Firm—Raymond J. Warren

[57] ABSTRACT

There is provided a mechanism for networking satellite and terrestrial networks. It comprises: maintaining subscriber-received power levels of terrestrial network transmissions about one order of magnitude above co-channel satellite transmissions to overcome interference and maintaining subscriber transmissions to terrestrial networks at power levels about one order of magnitude of the below co-channel transmissions to satellite networks to avoid causing interference at the satellite. Such power level maintenance is provided by the network in communication with such subscriber. Moreover, a non-orbiting ("grounded") satellite cooperates as a switching node of both the satellite network and a terrestrial network to relay information between a terrestrial subscriber and the satellite radiotelephone network over a terrestrial network. The terrestrial network and the satellite network may communicate via either the inter-satellite spectrum or the terrestrial-to-satellite spectrum.

7 Claims, 2 Drawing Sheets

NETWORKED SATELLITE AND TERRESTRIAL CELLULAR RADIOTELEPHONE SYSTEMS

This is a continuation of application Ser. No. 07/761,203, filed Sep. 17, 1991, and now abandoned, which is a divisional of Ser. No. 07/488,912, filed Mar. 6, 1990, now abandoned.

THE FIELD OF INVENTION

This invention is concerned with satellite radiotelephone communications.

More particularly, this invention is concerned with networking satellite cellular radiotelephone networks with terrestrial radiotelephone networks.

BACKGROUND OF THE INVENTION

As illustrated in FIG. 1, one can envision a satellite-based cellular radiotelephone infrastructure as consisting of a constellation of satellites in a low Earth, polar orbit, each satellite having a number of satellite-to-ground frequencies that illuminate hundreds to thousands of square miles of global surface area. Each frequency (F3, for example) could be reused (both from the very same satellite 102 as well as by neighboring satellites 101), provided sufficient geographic separation is maintained to avoid causing interference among radio-telephone subscribers (168) on the ground. A subscriber (168) is handed off from frequency F3 to frequency F1 and from satellite (102) to satellite (101) as the constellation moves overhead. Using switch exchanges aboard the satellite, the satellites route calls among themselves over high speed, high bandwidth inter-satellite links (160, 161, 162) in order to globally connect conversants on the ground (168 & 170). A more complete presentation of such a satellite cellular system is given in U.S. Patent application Ser. No. 263,849 to Bertiger, Satellite Cellular Telephone and Data Communication System, filed Oct. 28, 1988, assigned to Motorola.

Since the surface area illuminated by a single frequency is so large compared to terrestrial cellular radiotelephone systems, satellite cellular systems have far lower subscriber capacity and find limited utility in low density and rural markets; metropolitan cellular traffic is far too dense and demands much higher spectral reuse efficiency. With the high cost of building, launching, operating and maintaining a satellite infrastructure, the economic viability of offering radiotelephone service via satellite depends on the ability to integrate terrestrial radio-telephone networks into satellite cellular systems.

This invention takes as its object to overcome these shortcomings and to realize certain advantages presented below.

SUMMARY OF THE INVENTION

If the capacity of satellite-to-terrestrial links could be increased, as by "grounding" a satellite and utilizing its greater inter-satellite bandwidth, high capacity terrestrial networks could be interconnected with the satellite network to provide global cellular inter-working. Metropolitan traffic would be carried by the terrestrial system, while global service would be provided everywhere else by the satellite network.

Thus, there is provided a mechanism for networking satellite and terrestrial networks. It comprises: maintaining subscriber-received power levels of terrestrial network transmissions about one order of magnitude above co-channel satellite transmissions to overcome interference and maintaining subscriber transmissions to terrestrial networks at power levels about one order of magnitude of the below co-channel transmissions to satellite networks to avoid causing interference at the satellite. Such power level maintenance is provided by the network in communication with such subscriber. Moreover, a non-orbiting ("grounded") satellite cooperates as a switching node of both the satellite network and a terrestrial network to relay information between a terrestrial subscriber and the satellite radiotelephone network over a terrestrial network. The terrestrial network and the satellite network may communicate via either the inter-satellite spectrum or the terrestrial-to-satellite spectrum.

DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which.

DETAILED DESCRIPTION

Figure 1:
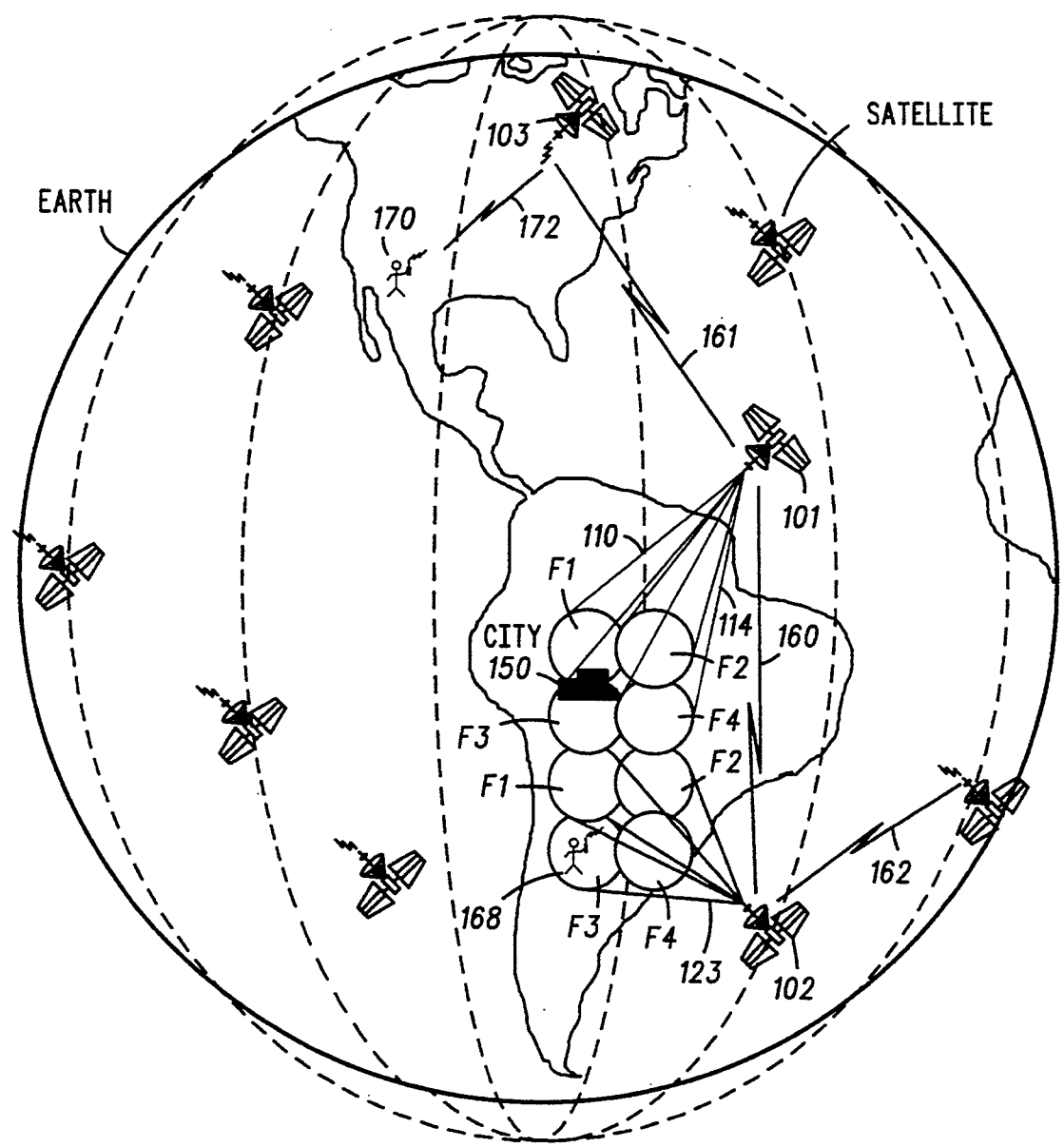
FIG. 1 is a macroscopic diagram illustrating networked satellite and terrestrial cellular radiotelephone networks according to the preferred embodiment of the invention.

FIG. 1 is macroscopic diagram illustrating networked satellite and terrestrial cellular radiotelephone networks according to the preferred embodiment of the invention.

As mentioned above, a major limitation of satellite-based radiotelephone networks is that the surface area illuminated by one satellite antenna constitutes such a large cell that spectral utilization is highly inefficient when compared to terrestrial cell sizes and terrestrial cellular frequency reuse efficiencies. Each satellite cell typically is several hundred miles across due to the limited capability of satellite antenna beam-shaping. This invention increases overall spectral reuse efficiency to that of terrestrial cellular, enhancing the economic feasibility of globally-integrated, cellular radiotelephone service using satellites.

This invention increases spectral efficiency through terrestrial frequency reuse of satellite-to-ground frequencies. In the metropolitan area (150) illustrated in FIG. 1, four frequency sets (F1-F4, a plurality of frequencies in each set) are reused terrestrially throughout the metropolitan area with geographic separation according to the so-called four-cell reuse pattern of Graziano, U.S. Pat. No. 4, 128,740, Antenna Array for a Cellular RF Communication System, assigned to Motorola. The problem associated with this terrestrial reuse of the satellite spectrum is to keep the satellite and terrestrial uses of the same frequencies from interfering with one another. According to the invention, the power of transmissions is coordinated and controlled so that those transmissions intended for the terrestrial network do not interfere with those intended for the satellite network.

To avoid interference, terrestrial transmissions are kept about 10 dB higher (at the subscriber) than satellite transmissions, thereby "capturing" the subscriber's receiver. Similarly, the power of subscriber transmissions intended for terrestrial networks are kept sufficiently below those intended for satellite reception, eliminating interference at the satellite receiver. Moreover, subscriber transmissions below the sensitivity threshold of the satellite receiver will not be heard by the satellite, but would likely be heard by a terrestrial receiver of equal sensitivity, due to the differential path loss. Thus, controlling the power of terrestrial transmissions with respect to the power of satellite transmissions and accounting for satellite receiver sensitivity provides the necessary mechanism for non-interfering terrestrial reuse of satellite cellular spectrum. The apparatus required and the system control necessary for such power control is not unlike that implemented in present terrestrial cellular radiotelephone networks and subscriber radiotelephone equipment (see U.S. Pat. No. 4,523,155 to Walczak et al., assigned to Motorola, and U.S. Pat. No. 4,613,990 to Halpern). Radiotelephone calling into and out of the local terrestrial service area is accomplished by "grounding" satellites to the roof tops of metropolitan structures. The "grounded" satellites use the very same (satellite-to-ground and ground-to-satellite) spectrum as the orbiting satellites (except for those frequencies in the set that might be used to provide supplemental terrestrial capacity).

Figure 2:
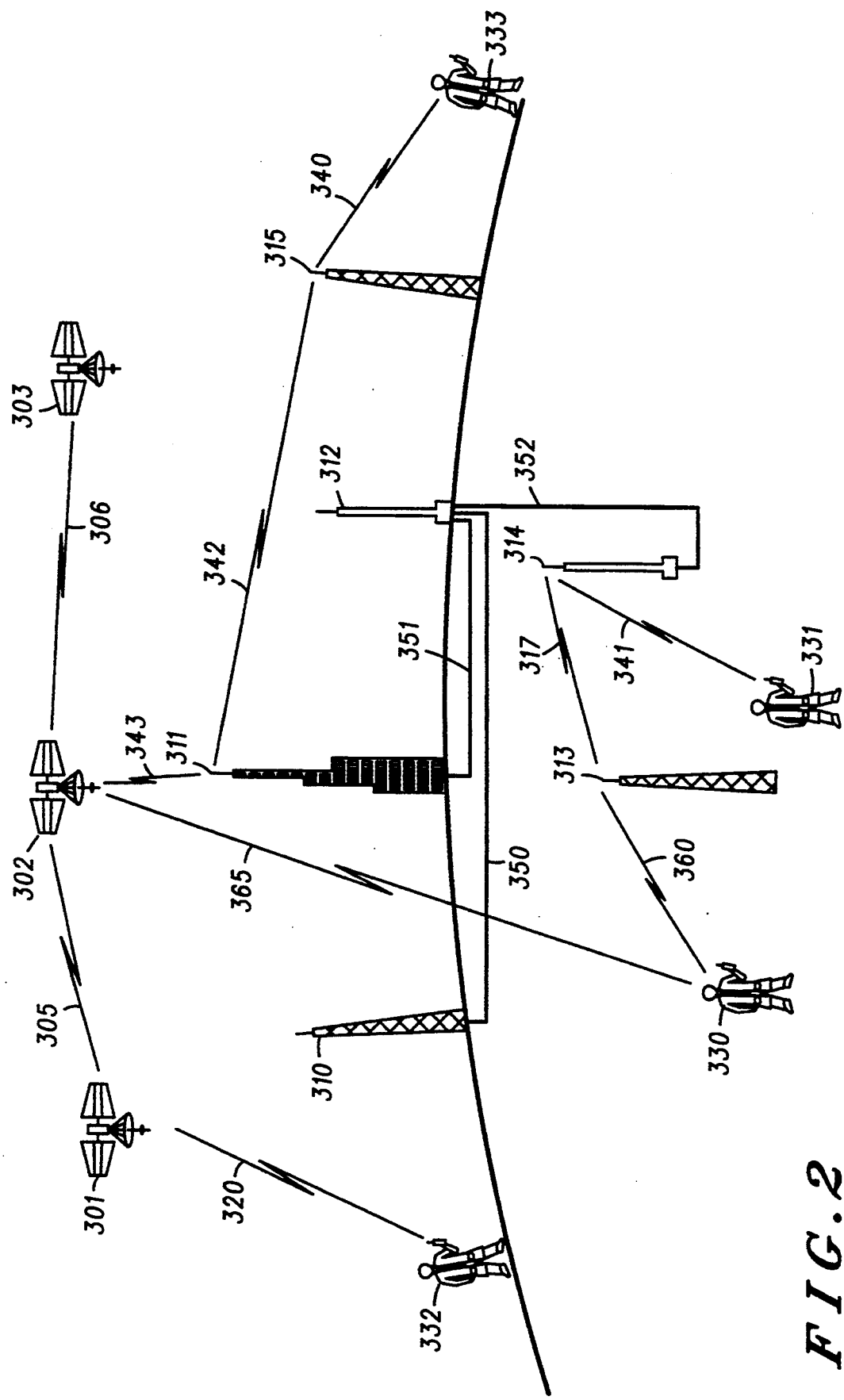
FIG. 2 illustrates subscribers inter-working in a networked satellite and terrestrial cellular radiotelephone network according to the preferred embodiment of the invention.

FIG. 2 illustrates subscribers inter-working in a networked satellite and terrestrial cellular radiotelephone networks according to the preferred embodiment of the invention. It further illustrates a satellite cellular radiotelephone network interconnected with terrestrial cellular radiotelephone networks according to the present invention. The satellite network consists of numerous satellites in low-Earth, polar orbits that sequentially pass overhead (301,302 & 303). They communicate with subscribers on the ground via a plurality of narrow-band frequencies (F1–F4, 320 & 343) and switch the calls among each other via broad-band spectrum (305 & 306) such as microwave, IR or LASER (light). The terrestrial networks illustrated (310, 311,312, 313, 314 & 315) could represent conventional cellular radiotelephone networks, in-building local-area radio networks, LANs, public switched telephone networks, private branch exchanges or the like. Each might be coupled independently with the satellite network via a "grounded" satellite atop its building. Otherwise, they might be networked together by broadband media such as microwave links (317 & 342) or fiber (350, 351 & 352), having one "grounded" satellite (311) designated to link to the satellite network (302) via one or more of the satellite frequencies (343).

In operation, a subscriber outside the coverage of a terrestrial radiotelephone network (332) initially transmits with sufficient power to capture a satellite receiver (301) at its furthest possible trajectory. An exchange between satellite and subscriber establishes successive power levels anticipated to be used in subsequent transmissions as the satellite moves predictably overhead and then out of range. Radiotelephone calls destined to another service area are switched by the originating satellite (301) via its inter-satellite links (305) to the satellite (302) presently servicing the intended recipient (330). This satellite (302) switches the call via a satellite-to-ground frequency (343) to a grounded satellite (311) atop a metropolitan structure, which, in turn, switches the call across fiber-optic links (351 & 352), point-to-point links (317), and to a terrestrial cellular network (313). The terrestrial network (313) relays the call to the subscriber at a power level some 10 dB above the level of the satellite frequency (343), while the subscriber answers at a power level sufficiently below that that would interfere with signals being returned to the satellite (302). The grounded satellite's location atop tall metropolitan structures lowers the power of satellite-to-ground transmissions from that required "in-the street". Nevertheless, the satellite (302) could transmit directly to the subscriber 330 via one of the satellite frequencies (365) when extra terrestrial capacity is required; both the satellite and the subscriber would transmit at higher power—clearly a less attractive alternative where satellite battery power and hand-portable radiotelephone battery power is concerned.

Thus, there has been provided a mechanism for interconnecting satellite and terrestrial cellular radiotelephone networks. Satellite frequencies are able to be reused terrestrially through power controlled differentials maintained between satellite transmissions and terrestrial transmissions. Spectral reuse efficiency is thereby increased. "Grounded" satellites provide the link to terrestrial networks. Seamless and global radiotelephone coverage is provided by terrestrial radiotelephone networks in metropolitan service areas and by satellite everywhere else, including those metropolitan areas without cellular service.

Although differential power control is the preferred embodiment of the invention, other methods of frequency planning would also be suitable for interconnected networks. Advantageously, the higher bandwidth inter-satellite spectrum can also be reused. The inter-satellite spectrum (305 & 306) could non-interferingly link the grounded satellites with the orbiting ones (and be reused once again between grounded satellites 317 & 342) due to the lateral directivity of inter-satellite links and the perpendicularity of the satellite-to-ground (and ground-to-satellite links). Spectral efficiency would thereby be increased yet again.

With this higher satellite-to-ground bandwidth, the grounded satellites could either be predeterminally and synchronously introduced into the inter-satellite interworkings, or with predetermined and synchronous forward and backward handoffs, could be synchronously interposed in the satellite call-routing backbone and become an integral part of the satellite switching function.

Yet other frequency plans are available. Conventional terrestrial cellular radiotelephone networks utilize seven frequency sets in a hexagonal reuse pattern of one central cell ringed by six others. If four more sets were utilized to accommodate the situation where a metropolitan area fell at the intersection of four satellite cells, the available cellular spectrum could be divided into eleven sets that could be used dynamically, synchronously and non-interferingly by frequency-agile transceivers aboard the satellites or on the ground; either the terrestrial or the satellite frequency "footprint" would have to change synchronously with each satellite's passage overhead to avoid interference. In other words, time-synchronous frequency reuse would need to be employed. Although less preferred, this would provide no worse than 7/11's frequency reuse, not considering near-ground antenna versus 10 dB path loss efficiencies. Other forms of disjoint frequency sets or satellite reuse patterns non-coincident with terrestrial patterns would provide some incremental spectral efficiencies.

For ease of understanding, the discussion has assumed Frequency Division Multiple Access FDMA channelization, but Time Division Multiple Access TDMA/FDMA implementation is contemplated in order to be compatible with emerging digital cellular standards in the US, Europe and Japan. Extension to direct sequence, spread spectrum or Code Division Multiple Access CDMA would be equally feasible.

Thus, there has been provided a mechanism for networking satellite and terrestrial networks. It comprises: maintaining subscriber-received power levels of terrestrial network transmissions about one order of magnitude above co-channel satellite transmissions to overcome interference and maintaining subscriber transmissions to terrestrial networks at power levels about one order of magnitude of the below co-channel transmissions to satellite networks to avoid causing interference at the satellite. Such power level maintenance is provided by the network in communication with such subscriber. Moreover, a non-orbiting ("grounded") satellite cooperates as a switching node of both the satellite network and a terrestrial network to relay information between a terrestrial subscriber and the satellite radiotelephone network over a terrestrial network. The terrestrial network and the satellite network may communicate via either the inter-satellite spectrum or the terrestrial-to-satellite spectrum.

While the preferred embodiment of the invention has been described and shown, it will be appreciated by those skilled in this field that other variations and modifications of this invention may be implemented. These and all other variations and adaptations are expected to fall within the ambit of the appended claims.

What I claim and desire to secure by Letters Patent is:

1. A method of networking a satellite network and a terrestrial network comprising the steps of:
   communicating information with a subscriber over a terrestrial network:
   communicating a first portion of the information between a communications device of the terrestrial network and a first orbiting satellite of the satellite network over a first communication path; and
   handing-off the information such that a second portion of the information is communicated between the communications device and a second orbiting satellite of the satellite network over a second communication path.

2. A method of networking a satellite network and a terrestrial network comprising the steps of:
   communicating information with a subscriber over a terrestrial network;
   communicating a first portion of the information between a communications device of the terrestrial network and a first satellite of an orbiting satellite cellular radiotelephone switching network over a first communication path;
   handing-off the information such that a second portion of the information is communication between the communications device and a second satellite of the orbiting satellite cellular radiotelephone switching network over a second communication path.

3. A method of networking a satellite network and a terrestrial network comprising the steps of:
   controlling a terrestrial network transmission within a frequency band with respect to a satellite network transmission also within said frequency band to overcome interference
   and controlling a subscriber transmission to the terrestrial network with respect to the terrestrial network transmission to the satellite network to avoid causing interference at a satellite of the satellite network; and
   relaying information between a terrestrial subscriber and a satellite network via the terrestrial network.

4. A method as claimed in claim 3, wherein the step of relaying comprises the step of relaying the information via a non-orbiting satellite that is cooperating as a functional element of the satellite network.

5. A method as claimed in claim 3, wherein the step of relaying comprises the step of relaying the information via a non-orbiting satellite that is cooperating as a switching node of both the satellite network and the terrestrial network.

6. A method as claimed in claim 5, wherein a communication link between the non-orbiting satellite and a first satellite of the satellite network is handed off to a second satellite in the satellite network.

7. An apparatus for networking a satellite network and a terrestrial network comprising:
   first means for communicating information with a subscriber over a terrestrial networks;
   second means, coupled to the first means, for communicating a first portion of the information between a communications device of the terrestrial network and a first satellite of an orbiting satellite cellular radiotelephone switching network over a first communication path and for handing-off the information such that a second portion of the information is communication between the communications device and a second satellite of the orbiting satellite cellular radiotelephone switching network over a second communication path.

* * * * *

UNITED STATES PATENT AND TRADEMARK OFFICE
CERTIFICATE OF CORRECTION

PATENT NO. : 5,394,561
DATED : February 28, 1995
INVENTOR(S) : Freeburg

It is certified that error appears in the above-indentified patent and that said Letters Patent is hereby corrected as shown below:

Column 6, line 41, "terrestrial networks" should be --terrestrial network--.

Signed and Sealed this

Nineteenth Day of December, 1995

Attest:

BRUCE LEHMAN

Attesting Officer     Commissioner of Patents and Trademarks